Figure 3:
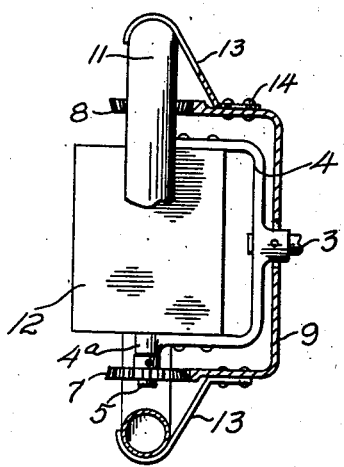

Dec. 28, 1937.  D. B. GARDNER  2,103,253

SOLID WEAVE SCANNING DEVICE

Filed Oct. 2, 1936

INVENTOR:
D. B. GARDNER,
BY
O O Martin
ATTORNEYS.

Patented Dec. 28, 1937

2,103,253

UNITED STATES PATENT OFFICE 2,103,253

SOLID WEAVE SCANNING DEVICE

Delamere B. Gardner, Los Angeles, Calif.

Application October 2, 1936, Serial No. 103,688

6 Claims. (Cl. 178—7.3)

The present invention has relation to means for transmitting pictures and refers particularly to a device for use in television apparatus.

It is the object of the invention to provide a simple and inexpensive device of this character, which may be used for direct scanning or which may be connected to transmit pictures to a suitable screen.

At the present time, one of the most difficult problems in television apparatus is to provide sufficient light to make possible a clear projection of a large size picture on a screen, and such apparatus of which I have any knowledge, besides being confined to the reproduction of very small pictures, are so expensive that they are not suitable for home service.

In view of this, it is a further object of the invention to provide a device capable of showing or reproducing large size pictures without great complications and at low cost.

For a complete understanding of the invention, reference is invited to the following description, and a drawing is hereto annexed, in which structures embodying the invention are clearly illustrated.

Figure 2:
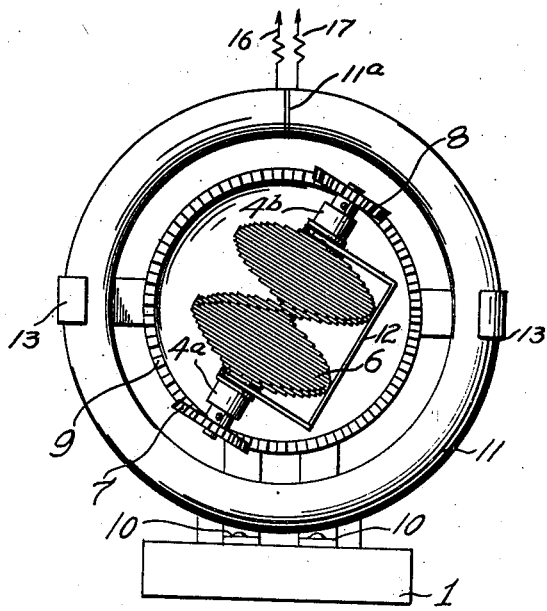
Figure 4:
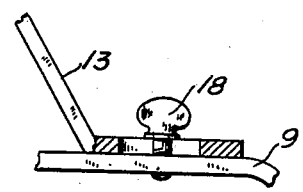
Figure 1:
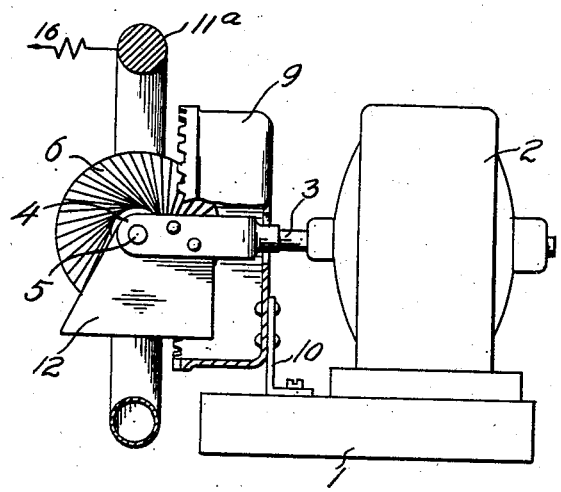

In the drawing:

Fig. 1 is a side elevation of a preferred form of the invention, and it is shown partly in section for the sake of clearness, Fig. 2 is a substantially corresponding end elevation of the device, Fig. 3 is a sectional plan view of a part of the device, and Fig. 4 shows a detail of construction on a larger scale.

The device of my invention, in the form illustrated in the drawing, comprises a base 1, on which a prime mover, such as an electric motor 2, is shown mounted. To the projecting end of the motor shaft 3 is secured a bifurcated frame 4, the outer ends of which are perforated to form bearings for a spindle 5. A helical mirror screen is mounted to rotate with this spindle, and it occupies the space between the bearing portions 4a, 4b. The ends of the spindle 5 support bevel gears 7 and 8, which mesh with a large stationary crown gear 9, and the latter is rigidly secured to the base, as by means of one or more brackets 10.

All of the foregoing may be substantially as fully described in my copending application, Ser. No. 54,700, heretofore filed by me on Dec. 6, 1935. It should therefore be sufficient here to state that rotation of the motor shaft results in rotation of the frame 4 and, as the gears 7 and 8 are compelled to run on the stationary crown gear 9, it follows that rotation is imparted to the helical screen 6.

An image on this mirror screen may be viewed directly or it may be projected on a screen in any suitable, well known manner, and because it may be directly viewed, or scanned on the helical mirror by the human eye, I have adopted for this mirror the term mirror screen or scanning screen.

Mounted in a plane parallel to the axis of the spindle 5 of the mirror screen and concentric with the motor shaft 3 is an electrically controlled tubular or solid anular element 11 which, for receiving purposes, may be a glow loop or glow ring. For the purpose of transmitting images, a suitable photo-sensitive loop is substituted but, for the sake of simplicity, it is hereinafter often referred to as a converting element because, in one case, it converts power impulses into light and, in the other, light modulations into power.

As above stated, one of the main problems in television practice is the difficulty of directing sufficient light to the scanning device to make possible the production of large pictures. In the device of my invention, it is seen that the mirror screen itself can be made as large as desired at no great expense and that, by means of the anular illuminating element, a very powerful light can be thrown directly and uniformly on the revolving mirror screen while its spindle is being turned end for end by the motor shaft.

Because the converting element 11 is annular, it is seen that light will be thrown on the screen from both sides, or pass from both sides of the screen to the element, as the case may be. This may result in a blurred or double picture, a condition which readily may be corrected by introducing between one side of the screen and the element a baffle plate, or visor 12. This visor should be of a size and so related to the screen that one side of the latter is completely covered and that only the opposite side of the screen receives light from the element. Conversely, if the element is a photo-electric cell, it is seen that only light from one side of the screen passes to the cell.

In order conveniently to position the element 11 in the proper relation to the screen, it is preferable to provide an adjustable mounting, and such is in the drawing shown to comprise a plurality of brackets 13, which brackets are clamped on the stationary crown gear 9, by means of screws or rivets 14. It is noted, at the top of Fig. 3, that these rivets are seated in elongated perforations of the brackets, to permit of axial adjustment before the brackets finally are clamped in correct position.

In order to render this adjustment more convenient and so that it may be changed at any time, even in the course of operation as, for instance, where a change in focal distance occurs, a modified form of clamping device is shown in detail in Fig. 4. A thumbscrew 18 is here for the sake of simplicity shown substituted. But I wish it understood that this is merely illustrative of ready adjustment and that more elaborate and convenient adjusting means may be substituted.

The specific construction of the annular element 11 is not herein shown or described, except that the tube is shown intersected by a partition 11a, and that it is provided with terminals 16, 17. It may also be preferred to substitute some form of solid element to take the place of the tubular, gas filled element here shown.

While I have herein shown and described a preferred form of the invention, I reserve the right to introduce such further modifications as may come within the scope of the appended claims.

I claim:

1. In combination, a mirror, means for rotating said mirror and simultaneously rotating its axis of rotation to produce a mirror screen on which a projected image may be viewed, means encompassing the mirror for illuminating said screen, and means blocking the flow of light to the screen from one side of said illuminating means.

2. In combination, a mirror, means for rotating said mirror and simultaneously rotating its axis of rotation to produce a mirror screen on which a projected image may be viewed, means encompassing the mirror for illuminating said screen, and means revolving with the screen blocking the flow of light to the screen from one side of said illuminating means.

3. In combination, a scanning device comprising a helical mirror, means for rotating said mirror on the helix axis and simultaneously to rotate said axis to provide a scanning mirror screen, and annular means coplanar with the rotating axis and encompassing the mirror to pass and receive impulses to and from said screen.

4. A scanning device comprising a helical mirror, means for rotating said mirror on the helix axis and also rotating it on its central cross axis, annular means coaxial with said central cross axis for passing impulses to and from said mirror, and means for axially adjusting said annular means.

5. In combination, a helical mirror, means for revolving said mirror and its axis of rotation to provide a mirror scanning screen, stationary annular impulse converting means coplanar with said axis and encompassing said mirror to pass impulses to and from said screen, and means revolving with the screen covering substantially one side of the screen, for blocking transfer of impulses to and from that side of the screen.

6. In combination, a helical mirror which, when revolving on a helix axis forms a screen upon which a projected image may be viewed, means for revolving said mirror and simultaneously revolving the helix axis on its central cross axis to produce said screen effect, means encompassing said mirror for carrying impulses to and from the mirror screen, and means revolving with the mirror for blocking said impulses to said screen from one side of said encompassing means and from the screen to one side of the latter only.

DELAMERE B. GARDNER.